W. F. McBRIDE.
ARTIFICIAL BAIT.
APPLICATION FILED FEB. 4, 1914.

1,110,956.

Patented Sept. 15, 1914.
2 SHEETS—SHEET 1.

Witnesses
J. R. Heinrichs
C. C. Hines

Inventor
William F. McBride
By Victor J. Evans
Attorney

W. F. McBRIDE.
ARTIFICIAL BAIT.
APPLICATION FILED FEB. 4, 1914.
1,110,956.
Patented Sept. 15, 1914.
2 SHEETS—SHEET 2.
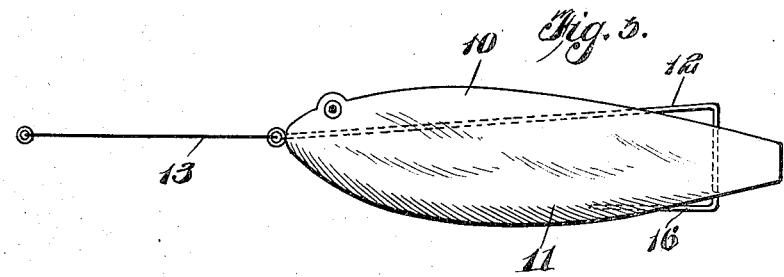
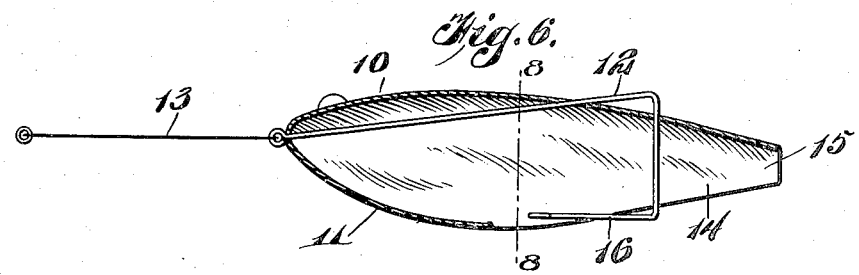
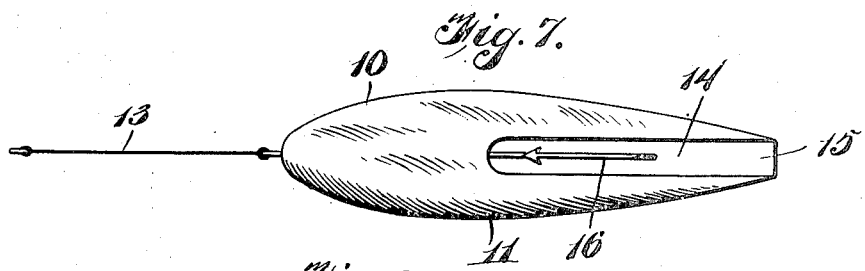
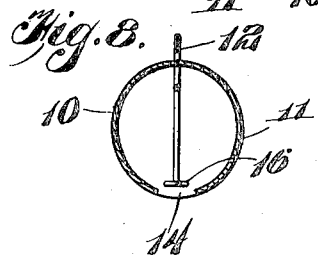
Witnesses
Inventor
William F. McBride
By Victor J. Evans
Attorney

UNITED STATES PATENT OFFICE.

WILLIAM F. McBRIDE, OF WARSAW, INDIANA.

ARTIFICIAL BAIT.

1,110,956.  Specification of Letters Patent.  Patented Sept. 15, 1914.

Application filed February 4, 1914. Serial No. 816,493.

*To all whom it may concern:*

Be it known that I, WILLIAM F. MCBRIDE, a citizen of the United States, residing at Warsaw, in the county of Kosciusko and State of Indiana, have invented new and useful Improvements in Artificial Bait, of which the following is a specification.

This invention relates to artificial bait of that type made in imitation of the natural bait which they are intended to represent, and in which the hook or hooks are normally concealed and guarded, to prevent the same from becoming caught in weeds, logs, or other obstacles in the water.

One object of my invention is to provide an artificial bait of this character, in which the hook or hooks are normally concealed within a hollow elastic body, capable of being compressed by the fish on taking the bait to project the hooks, and in which the elastic hollow body is formed with an opening or openings for the projection of the hooks and with means for permitting of the flow of water therethrough when drawn or moved within the water, so that the bait will be balanced and maintain a proper and lifelike position.

A further object of the invention is to provide an artificial bait which is simple of construction, strong, durable and efficient in construction and use, and in which provision is made for reinforcing the hollow body, supporting the hook or hooks and connecting the bait with a line through one and the same leader or connecting element.

The invention consists of the features of construction, combination and arrangement of parts herein fully described and claimed, reference being had to the accompanying drawings in which:—

Figure 1:
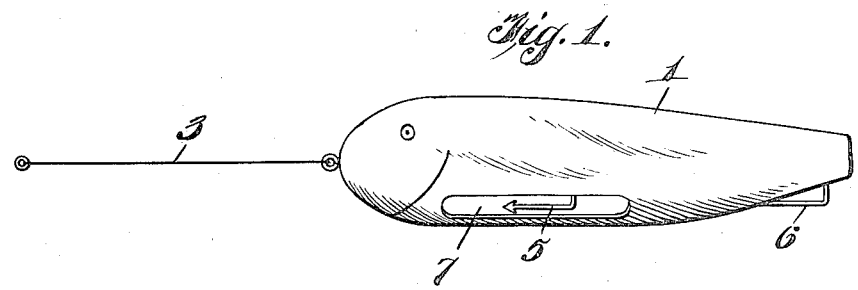
Figure 2:
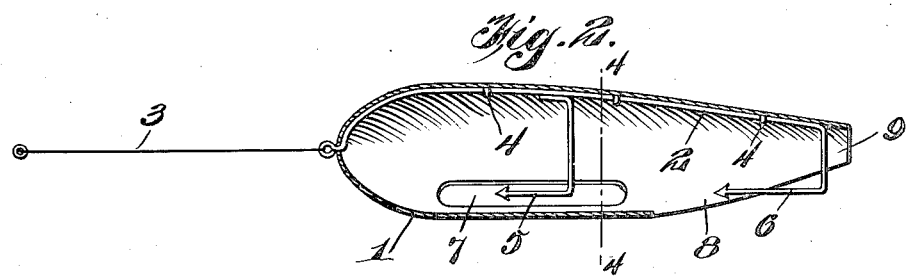
Figure 3:
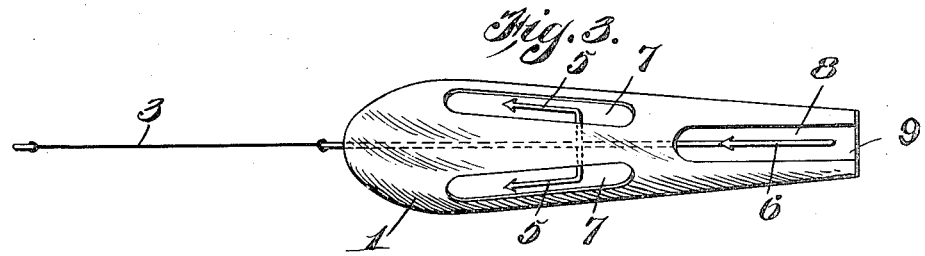
Figure 4:

Figure 1 is a side elevation showing the invention in the form of an artificial minnow. Fig. 2 is a vertical longitudinal section of the same. Fig. 3 is a bottom plan view of the artificial minnow. Fig. 4 is a vertical transverse section on the line 4—4 of Fig. 2. Fig. 5 is a side elevation of a modified form of the bait, made to simulate a frog. Fig. 6 is a vertical longitudinal section of the same. Fig. 7 is a bottom plan view. Fig. 8 is a vertical transverse section on line 8—8 of Fig. 6.

Referring to Figs. 1 to 4 inclusive, 1 designates the hollow body of the bait, which consists of a shell of rubber or other suitable water-proof, elastic material, this body is made in simulation of the general shape of the body of a minnow, the eyes, gills, etc., being simulated by painting or applying suitable parts representing the same to the body. The body is stretched over a frame composed of a back-bone 2 of wire, which terminates at its forward end in a leader 3 for connection with the fishing line. The back-bone or stiffening member engages staples or connecting elements 4 on the hollow body, whereby the latter is secured in position, and also serves as a support for the hooks 5 and 6, of which any desired number may be employed. As shown in the present instance, a pair of hooks 5 are disposed within the forward portion of the body on opposite sides of the center thereof, and have their shanks fixed to the frame member 2, while a single hook 6 is arranged at the rear end or tail of the body and also has its shank suitably fixed to the frame member 2. The bobbed portions of the hooks are arranged to be exposed and projected through the slots 7, while the bobbed portion of the hook 6 is arranged to be exposed and projected through a slot 8, the said slots 7 and 8 being formed in the portions of the body adjacent to the hooks.

Normally the hooks lie slightly within the body, so that they will be guarded against catching into weeds, logs and other obstructions in the water, but when the bait is taken by a fish the hollow body 1 will be compressed by the jaws of the fish, thus exposing the hooks for action. The rear end of the body is provided with an opening 9 through which the water contained in the body may flow rearwardly when the minnow is drawn through the water. By this means the stability of the minnow is preserved and the current of water in flowing through the body of the minnow not only adapts it to travel in a substantially straight line but imparts to it a sufficient oscillatory movement simulating the motion of a natural minnow.

It will of course be understood that the essential features of the invention may be embodied in natural bait of all kinds commonly used, and that one or more hooks may be employed.

In Figs. 5 to 8, inclusive, I have illustrated one modification of my invention in which the bait 10 is formed to simulate a natural frog. The body 11 of the bait in this instance is also hollow and made of rubber or elastic material and secured in a similar manner to a frame member 12 connected with the leader 13, but the body of the bait is provided in its bottom with a single slot 14 communicating with its open and rear end 15. The single hook 16 employed is connected with the frame member 12 and arranged so as to lie slightly within the line of the slot 14 and to be projected therethrough for action when the bait is seized by a fish. The operation with this form of the invention will be readily understood from the foregoing description.

I claim:—

1. An artificial bait comprising a hollow elastic body, said body being open at its rear end and having a longitudinally extending slot in its underside communicating with said open rear end of the body, a frame member disposed mainly within the body and having a portion arranged to overlie said slot, and an angularly bent terminal at the rear of said frame member formed to provide a forwardly projecting hook normally concealed within the body and disposed adjacent to and in line with said longitudinally extending slot.

2. An artificial bait comprising a hollow elastic body open at its rear end, said body being provided with slots on opposite sides of its fore portion and open at its tail portion and provided in its bottom with a slot communicating with the open tail portion, a frame member inclosed within the hollow body and to which the body is attached, hooks normally inclosed within the body and carried by the frame member and disposed in line with said slots and adapted to be projected therethrough when the body is compressed, and a leader connected with the frame member.

3. An artificial bait comprising a hollow elastic body, said body being open at its rear end and having a longitudinally extending slot in its underside communicating with said open rear end, the said body also having longitudinally extending slots in its sides mainly in advance of its transverse center, a frame member extending longitudinally within the body, a hook at the rear end of said frame member projecting forwardly into the body adjacent of and in line with the bottom slot, and opposed hooks upon the frame member depending within the body and disposed adjacent to and in line with the side slots, and a leader connected with the forward end of the frame member.

In testimony whereof I affix my signature in presence of two witnesses.

WILLIAM F. McBRIDE.

Witnesses:
MERL L. GOCHENOUR.
WM. CARROLL.